(12) United States Patent
Stokkan et al.

(10) Patent No.: US 8,949,181 B2
(45) Date of Patent: Feb. 3, 2015

(54) REAL-TIME THRESHOLD STATE ANALYSIS

(75) Inventors: Solve Stokkan, Ski (NO); Stephen Haler, Coeur D'Alene, ID (US)

(73) Assignee: Solarwinds Worldwide, LLC, Austin, TX (US)

( * ) Notice: Subject to any disclaimer, the term of this patent is extended or adjusted under 35 U.S.C. 154(b) by 2114 days.

(21) Appl. No.: 11/355,044

(22) Filed: Feb. 14, 2006

(65) Prior Publication Data
US 2006/0195309 A1 Aug. 31, 2006

Related U.S. Application Data

(60) Provisional application No. 60/656,326, filed on Feb. 25, 2005, provisional application No. 60/656,338, filed on Feb. 25, 2005, provisional application No. 60/656,325, filed on Feb. 25, 2005, provisional application No. 60/656,337, filed on Feb. 25, 2005, provisional application No. 60/656,315, filed on Feb. 25, 2005.

(51) Int. Cl.
*G06F 7/00* (2006.01)
*G06N 5/04* (2006.01)
*G06N 5/02* (2006.01)

(52) U.S. Cl.
CPC ... *G06N 5/04* (2013.01); *G06N 5/02* (2013.01)
USPC .......................................................... 707/618

(58) Field of Classification Search
USPC .......................................................... 707/618
See application file for complete search history.

(56) References Cited

U.S. PATENT DOCUMENTS

| 2001/0042058 A1* | 11/2001 | Harrington et al. | 707/1 |
| 2002/0078121 A1* | 6/2002 | Ballantyne | 709/102 |
| 2005/0120122 A1* | 6/2005 | Farnham | 709/230 |

* cited by examiner

*Primary Examiner* — Truong Vo
(74) *Attorney, Agent, or Firm* — Squire Patton Boggs (US) LLP

(57) ABSTRACT

A threshold tracking system enabling users to arrange input data according to a set time of input creation is disclosed. The tracking system defines threshold variables that maintain counts of inputs over a set threshold time and the input values associated with each count. The threshold variables also maintain timelines, which are divided into time periods. Information may be stored in a working memory, which utilizes a scheduler to update state variable values.

15 Claims, 9 Drawing Sheets

REAL-TIME THRESHOLD STATE ANALYSIS

RELATED APPLICATIONS

This application claims priority to U.S. Provisional Patent Application No. 60/656,326, filed Feb. 25, 2005 and entitled EFFECTIVE POLICY THROUGH INTELLIGENT CORRELATION (EPIC) RULE LANGUAGE; U.S. Provisional Patent Application No. 60/656,338, filed Feb. 25, 2005 and entitled MATCH NETWORK CONSTRUCTION; U.S. Provisional Patent Application No. 60/656,325, filed Feb. 25, 2005 and entitled TEMPORAL RESOLUTION OF JOIN NODES IN EVENT CORRELATION; U.S. Provisional Patent Application No. 60/656,337, filed Feb. 25, 2005 and entitled REAL-TIME THRESHOLD STATE ANALYSIS; U.S. Provisional Patent Application No. 60/656,315, filed Feb. 25, 2005 and entitled TEMPORAL KNOWLEDGEBASE, the disclosures of which are hereby incorporated by reference in their entireties.

SUMMARY

In one embodiment, a system is implemented for enabling users to arrange input data according to a set time of input creation. The system comprises a working memory comprising at least one statevar and a scheduler comprising an update thread and a stack. The statevar is configured to notify the scheduler of data changes, and the statevar comprises at least one element of a hash table of the working memory. The scheduler is configured to modify at least one value of the statevar, and the scheduler is configured to notify the stack of changes in the statevar. The update thread tracks changes to the statevar.

In another embodiment, a process for allocating inputs within a timeline comprises receiving an input within a response window and, in response to receiving the input within the response window, updating a timeline and calculating a time period to increment. The process further comprises determining whether a distinct field occurs and, in response to the distinct field not occurring, incrementing a period count. After incrementing the period count, the process further comprises determining whether the process has reached an end of the period count. After reaching the end of the period count, the process further comprises entering a threshold sub-routine.

These and other embodiments of the present application will be discussed more fully in the detailed description. The features, functions, and advantages can be achieved independently in various embodiments of the present application, or may be combined in yet other embodiments.

DETAILED DESCRIPTION

In the following detailed description, reference is made to the accompanying drawings that form a part hereof, and in which is shown by way of specific illustrative embodiments in which the invention may be practiced. These embodiments are described in sufficient detail to enable those skilled in the art to practice the invention, and it is to be understood that other embodiments may be utilized and that various changes may be made without departing from the spirit and scope of the present invention. The following detailed description is, therefore, not to be taken in a limiting sense.

The real-time analysis of multiple events from disparate sources presents unique challenges regarding the validity and integrity of the data. With no guarantee that the source data is time synchronous, a mechanism is desired that can still effectively analyze and count these data.

A threshold tracking system enables users to arrange input data according to a set time of input creation. The threshold tracking system may set a working time frame from which to accept inputs and keep a running count of when a set number of inputs over a set period of time has breached a specified target value. When a threshold is breached, the threshold system may produce a summary of the inputs that triggered the threshold breach.

With the threshold tracking system operating in real-time, it is possible to analyze an event rate of unordered inputs and detect when those inputs breach a defined boundary, despite significant variances in event origin time. The threshold tracking system may also provide a means to detect when an associated event rate subsides and falls below a specified target boundary.

Figure 3:
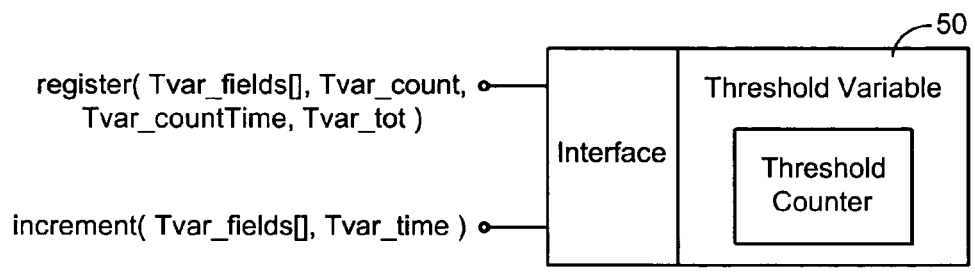
FIG. 3 shows an interface between a threshold variable and some of its methods.
Figure 4:
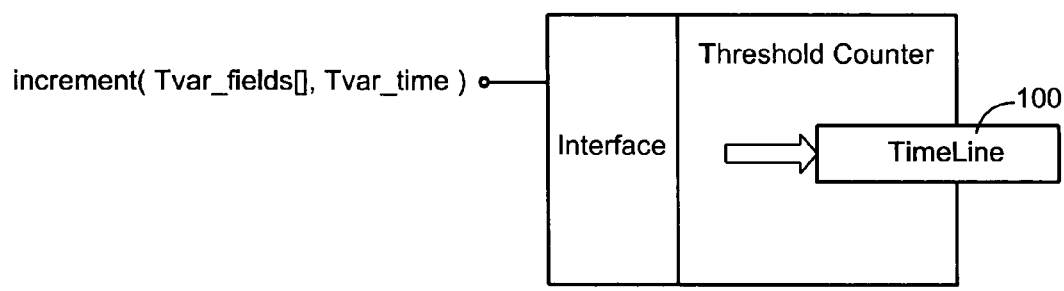
FIG. 4 shows an interface between a threshold counter and one of its methods.
Figure 5:
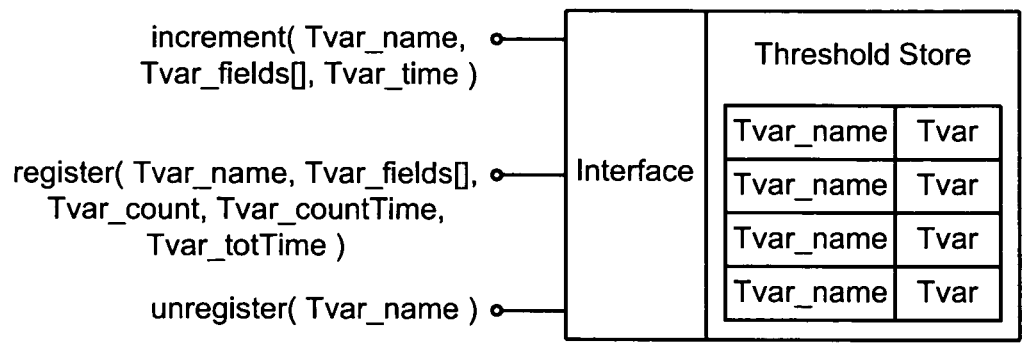
FIG. 5 shows an interface between a threshold store and some of its methods.

The threshold tracking system may define a set of threshold variables 50, as shown in FIG. 3. A threshold variable 50 comprises a data structure that may maintain counts of inputs over a set threshold time and the input values associated with each count.

Figure 1:
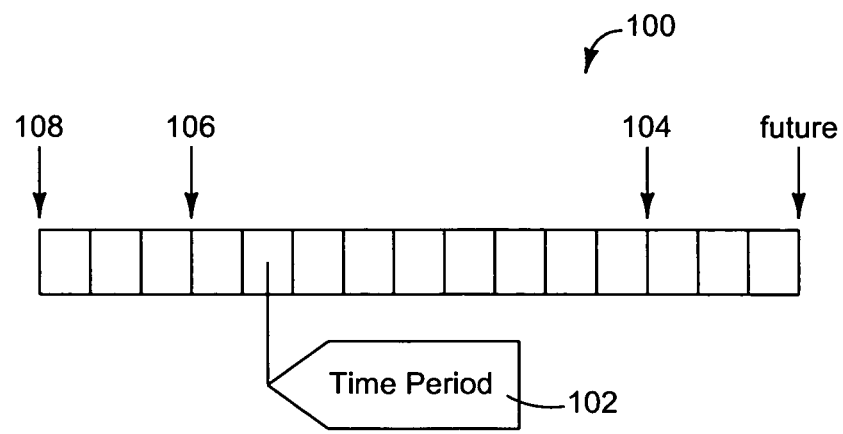
FIG. 1 shows a timeline maintained by a threshold variable.
Figure 2:
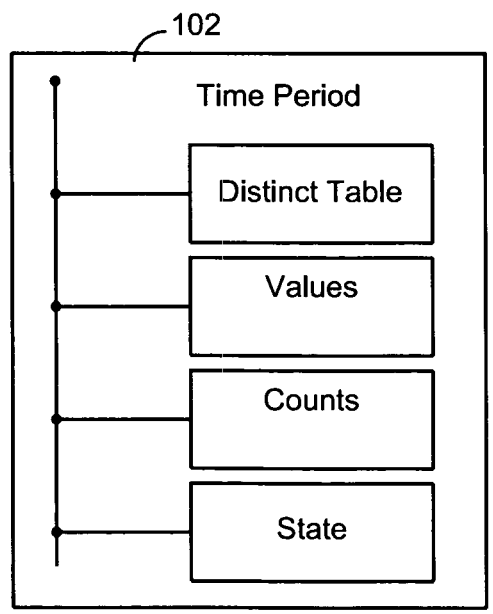
FIG. 2 shows a time period, which is part of the timeline.

Each threshold variable 50 may maintain a timeline 100, as shown FIG. 1. The timeline 100 comprises a set length of time in which a data value may be considered a valid threshold input to modify the threshold variable's 50 input count.

As shown in FIG. 1, the timeline 100 may be divided into time periods 102. A time period 102 represents the length of the threshold time in which the threshold tracking system may calculate a threshold breach. Dividing the timeline 100 into time periods 102 optimizes the amount of information maintained by the threshold variable 50.

Some of the time periods 102 maintained by the timeline 100 may represent a buffer of time around the current threshold tracking system time period 102, called a response window. The response window may include a set of time periods 102 ahead of the current time period 102, called future time periods 104, as well as a set of time periods 102 behind the current time period 102, called past time periods 106. The response window enables the threshold variable 50 to compute threshold breaches on un-ordered input data that arrive too early or too late for the threshold time length, but that are still valid for the threshold variable 50. The response window gives the threshold variable's 50 timeline 100 a time period buffer both ahead and behind the current time period 102 to handle un-ordered threshold data input.

The timeline 100 may also maintain an extra time period 102 behind the past time periods 106 called a history time period 108. In some embodiments, the history time period 108 comprises a read-only time period 102 that holds values that are used to track a possible threshold breach at the end of the last past time period 106 of the timeline 100.

Each time period 102 may be divided into 60 elements called time frames. A time frame represents a fraction of a time period 102 and may maintain a specified number of elements received within the time frame and the input values represented by the time frame. An upper bound may be placed on the number of time frames, conserving memory but sacrificing accuracy at higher threshold time values.

Figure 6:
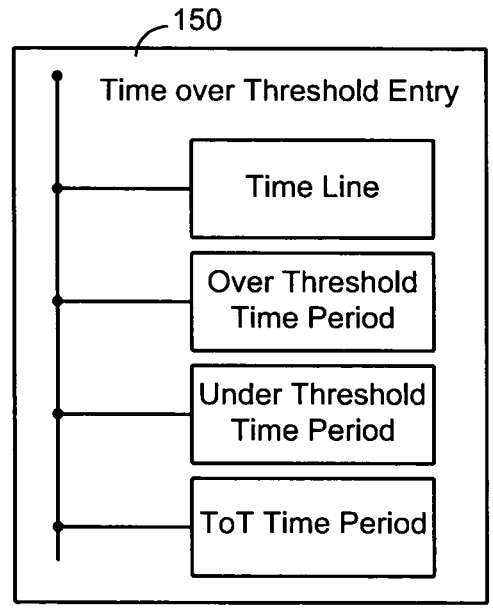
FIG. 6 shows elements of a time over threshold entry.
Figure 7:
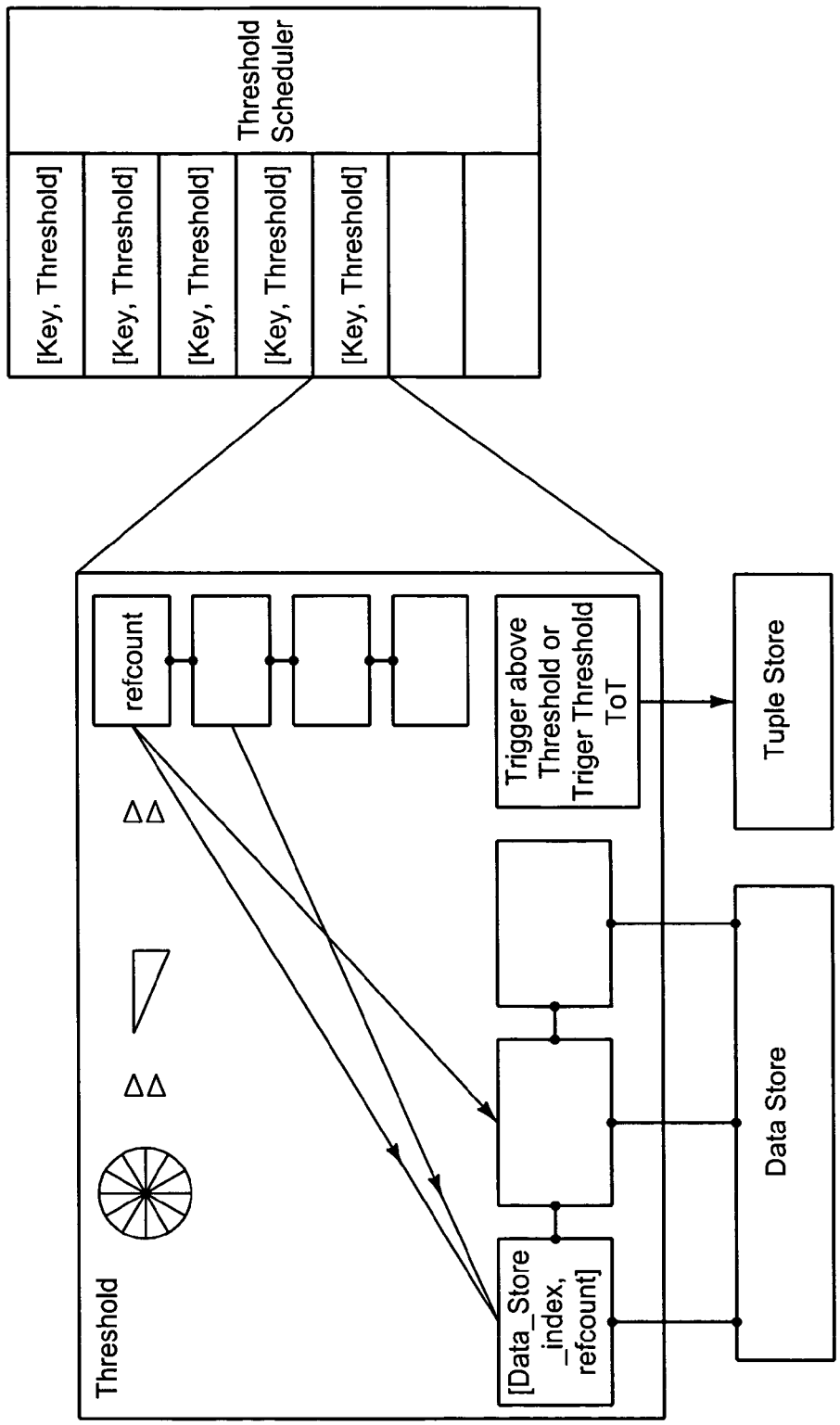
FIG. 7 shows elements of a key threshold.

In some embodiments, the threshold variable 50 supports two types of threshold breach scenarios, over threshold (OT), and time over threshold 150 (TOT), the latter of which is shown in FIG. 6. The over threshold (OT) scenario may be recorded when the number of input values per time period 102 becomes equal to a set threshold value. The time over threshold 150 (TOT) scenario may be recorded when the number of input values per time period 102 is equal to or greater than a set threshold value for a set amount of time.

As real-time, unordered event data arrive from disparate sources, the structures described above may be utilized to evaluate the data within a temporal framework that is dynamically constructed, modified, and destroyed as the event streams are analyzed. The associated data input rate per element may then be accurately incremented and decremented without regard for the variances in event source time.

In some embodiments, threshold variables 50 are identified by a named location in working memory 200, and are incremented by a terminal node from the match network 300. Threshold variables 50 may be constrained based on various criteria, such as alert type or tuple type, or by the value of any data in the tuple. Threshold variables 50 may also be indexed by their alert type or tuple type, and may be hashed by their primary data constraint. When triggered, threshold variables 50 may create a tuple, and the created tuple may have all accumulated data sets to be processed by the match network 300. Threshold variables 50 may also be set to trigger on an over threshold (OT) break or an under threshold (UT) break. This trigger may be set to reoccur after the threshold variable 50 has existed in either a time over threshold 150 (TOT) scenario or a time under threshold (TUT) scenario for predetermined time. The period of time tracked by a threshold variable 50 may be divided into synchronous time slices. Threshold variables 50 may maintain data and the data's type associated with an event, and may maintain the time slice to which the data apply.

An example of a definition specification of a threshold variable 50 is shown by the following table:

```
SECTION:VARIABLES
    Define Threshold $NAME
        key field      $KEY1
        key field      $KEY2
        field          $FIELD3
        field          $FIELD4
        field          $FIELD5
        threshold      100
        underthresh    20
```

-continued

```
        range          60 sec
        OTrange        30 sec
        UTrange        2 min
        stacklimit     100
        field limit    $KEY1 1000
```

An example of a usage specification of a threshold variable 50 is shown by the following table:

```
SECTION:PARAM
    input Threshold T1
    lookup Threshold Q1
SECTION:RULES
    (T1)
    T1::Source IP == A::Source IP
    T1 contains A::Source IP
    T1::Source IP == A::Dest IP
    T1::Source IP contains A::Dest IP
    T1::DetectionTime
    T1::InsertionTime
SECTION:TIME
    Within 20 minutes (T1 A B)
```

Figure 13:
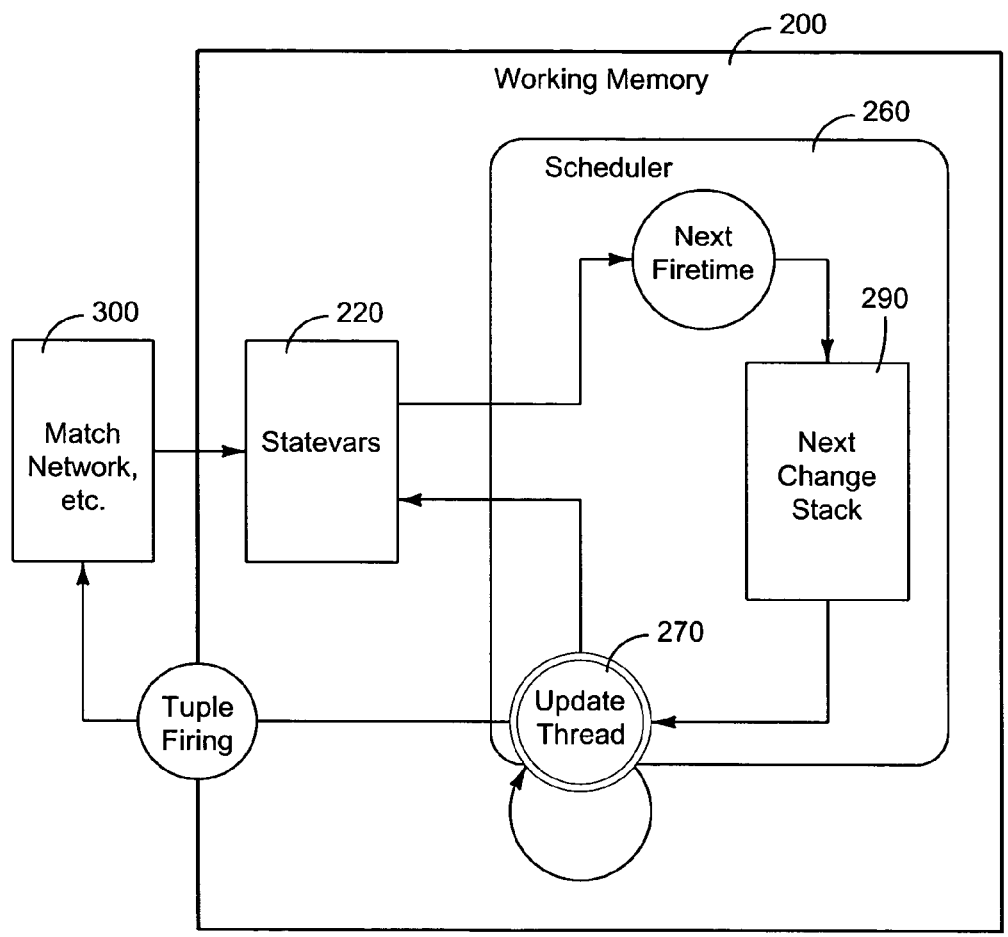
FIG. 13 shows another diagram of the working memory.
Like reference numbers and designations in the various drawings indicate like elements.

In some embodiments, statevars 220 (sometimes referred to as state variables), may be identified by a named location in working memory 200, and may be indexed solely by name, as shown in FIG. 13. The value of a statevar 220 may be changed by a terminal node from the match network 300. Statevars 220 may be constrained based on complex criteria, such as multiple logical constraints, that are the result of a rule action. Statevars 220 may be hashed by zero or more data constraints in a merged-key configuration. When statevars 220 are triggered, they may create a tuple with accumulated data that is processed by a match network 300. Statevars 220 may be set to trigger only on a specified value, to automatically decay based on a rate over time, or to reset their value to a certain level after expiring. Statevars 220 may also maintain data, and the data's type, associated with an instance.

An example of a definition specification of a statevar 220 is shown by the following table:

```
SECTION:VARIABLES
    Define SingleStatevar $NAME
        Field          $FIELD1
        field          $FIELD2
        field          $FIELD3
        renew          60
        trigger        0
        decay          -1
        rate           1 sec
        stacklimit     100
        field limit    $KEY1 1000
    Define ListStatevar $NAME
        key field      $KEY1
        key field      $KEY2
        field          $FIELD3
        field          $FIELD4
        field          $FIELD5
        renew          60
        trigger        0
        decay          -1
        rate           1 sec
        stacklimit     100
        field limit    $KEY1 1000
```

An example of a usage specification of a statevar is shown by the following table:

```
SECTION:PARAM
    input SingleStatevar S1
    lookup SingleStatevar Q1
    lookup ListStatevar Q2
SECTION:RULES
    (S1)
    S1::Source IP == A::Dest IP
    S1::DetectionTime
    S1::InsertionTime
    S1::Value
    Q2 holds A::Source IP
    Q1::Value == S1::Value
    Q2(A::Source IP)::Dest IP != A::Dest IP
SECTION:TIME
    Within 20 minutes (S1 A B)
```

Figure 8:
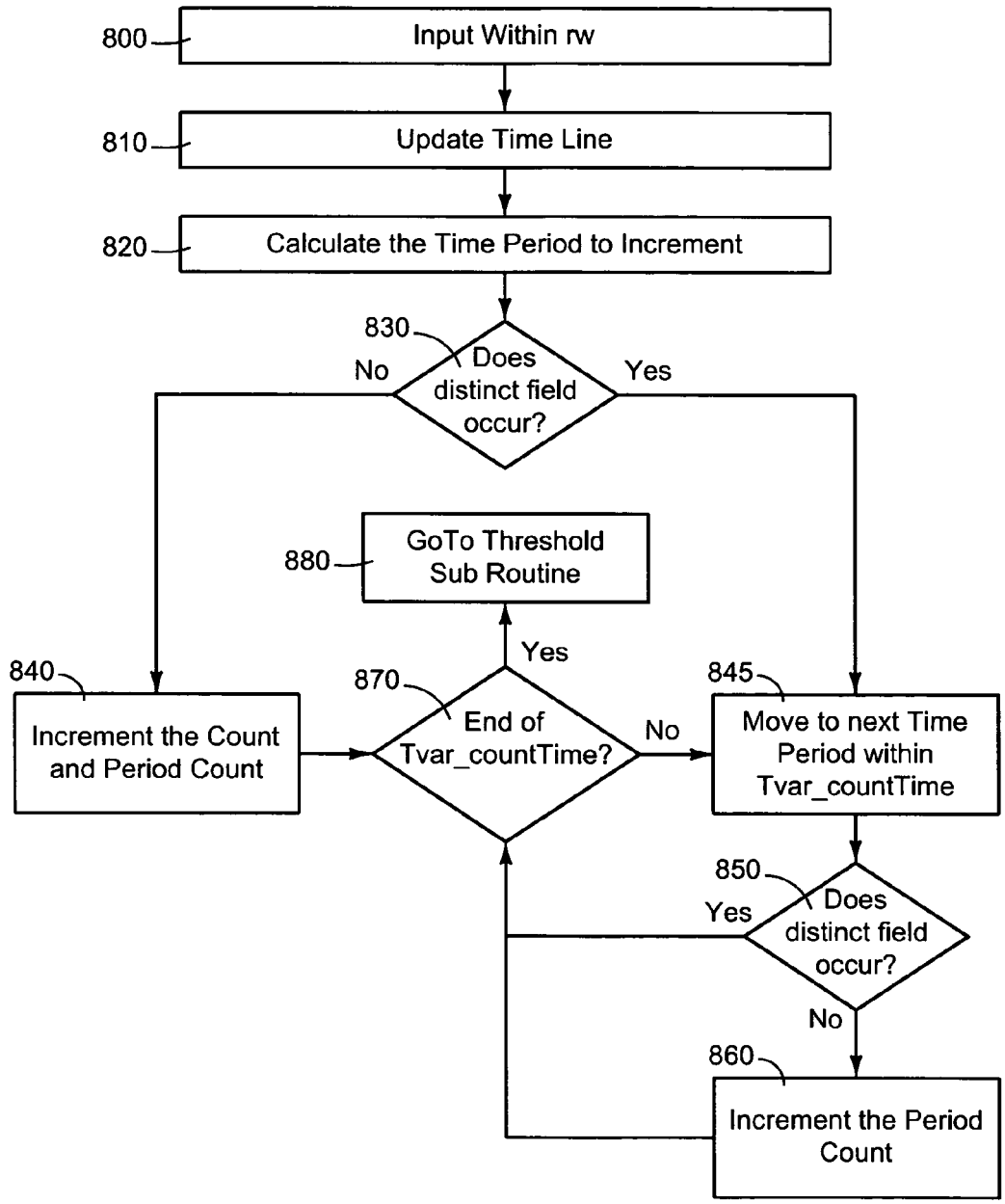
FIG. 8 shows a flowchart of a process allocating inputs within the timeline.

FIG. 8 shows a flowchart of a process allocating inputs within the timeline. As shown in this flowchart, when the threshold tracking system receives an input within the response window, either a future time period 104 or a past time period 106, the threshold system may update the timeline 100 and calculate the time period to increment. If a distinct field occurs, then the threshold tracking system may move to the next time period 102 within the Tvar_countTime, as described in the following paragraph. If a distinct field does not occur, then the threshold tracking system may increment the count and period count. If, after incrementing the count and period count, the threshold tracking system reaches the end of Tvar_countTime, then the threshold tracking system may go to the threshold sub-routine shown in FIG. 9. Otherwise, the threshold tracking system may move to the next time period 102 within the Tvar_countTime.

If, after moving to the next time period 102, a distinct field occurs, then the threshold tracking system may go to the threshold subroutine if it has reached the end of Tvar_countTime; if the threshold tracking system did not reach the end of Tvar_countTime, then it may again move to the next time period 102 within Tvar_countTime. If a distinct field did not occur, then the threshold tracking system may increment the period count, and arrive at the same place in the process as if a distinct field had occurred. Eventually, the threshold tracking system should go to the threshold subroutine.

Figure 9:
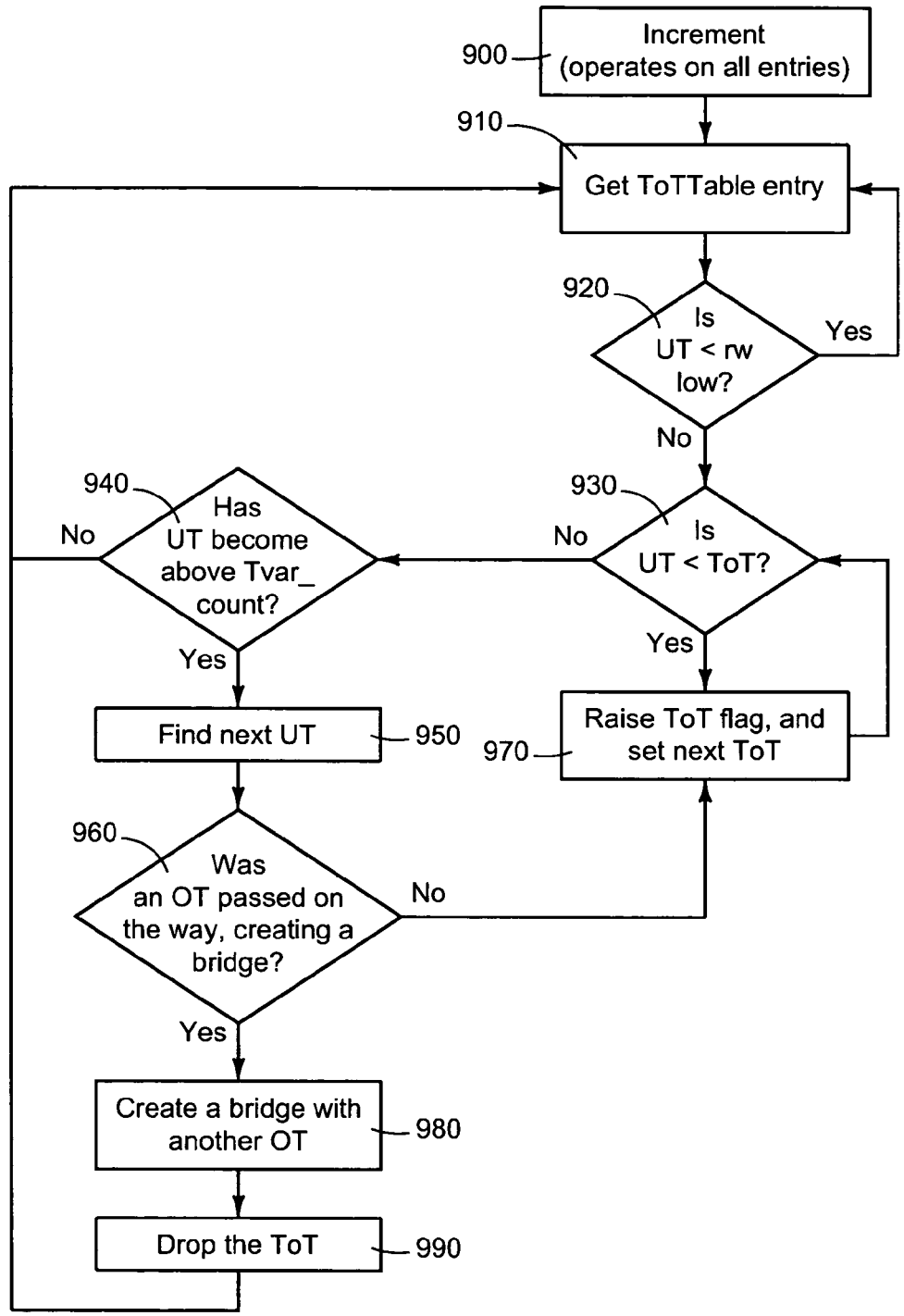
FIG. 9 shows a flowchart of a threshold sub-routine finding a time over threshold breach.

FIG. 9 shows a flowchart of a threshold sub-routine finding a time over threshold breach. The threshold tracking system proceeds from the increment block 900 to the get to time over threshold entry block 910 to the compare under threshold to response window block 920. If the under threshold is less than the response window, then the tracking system will return to the time over threshold entry block 910. If the under threshold is greater than the response window, then the threshold tracking system will go to the compare under threshold to time over threshold block 930. If the under threshold is less than the time over threshold, then the threshold tracking system will raise the time over threshold and set the next time over threshold, and again make the check at the compare under threshold to time over threshold block 930.

From the compare under threshold to time over threshold block 930, the threshold tracking system proceeds to the compare under threshold to Tvar_count block 940. If the under threshold is not greater than the Tvar_count, then the threshold tracking system returns to the threshold entry block 910. If the under threshold is greater than the Tvar_count, then the threshold tracking system will find the next under threshold, and proceed to the over threshold block 960. If the threshold tracking system determines that it did not pass an over threshold, then it will raise the time over threshold and set the next time over threshold, and again make the check at the compare under threshold to time over threshold block 930. If the threshold tracking system determines that it did pass an over threshold, then it will create a bridge with another over threshold, drop the time over threshold, and return to the threshold entry block 910.

Figure 10:
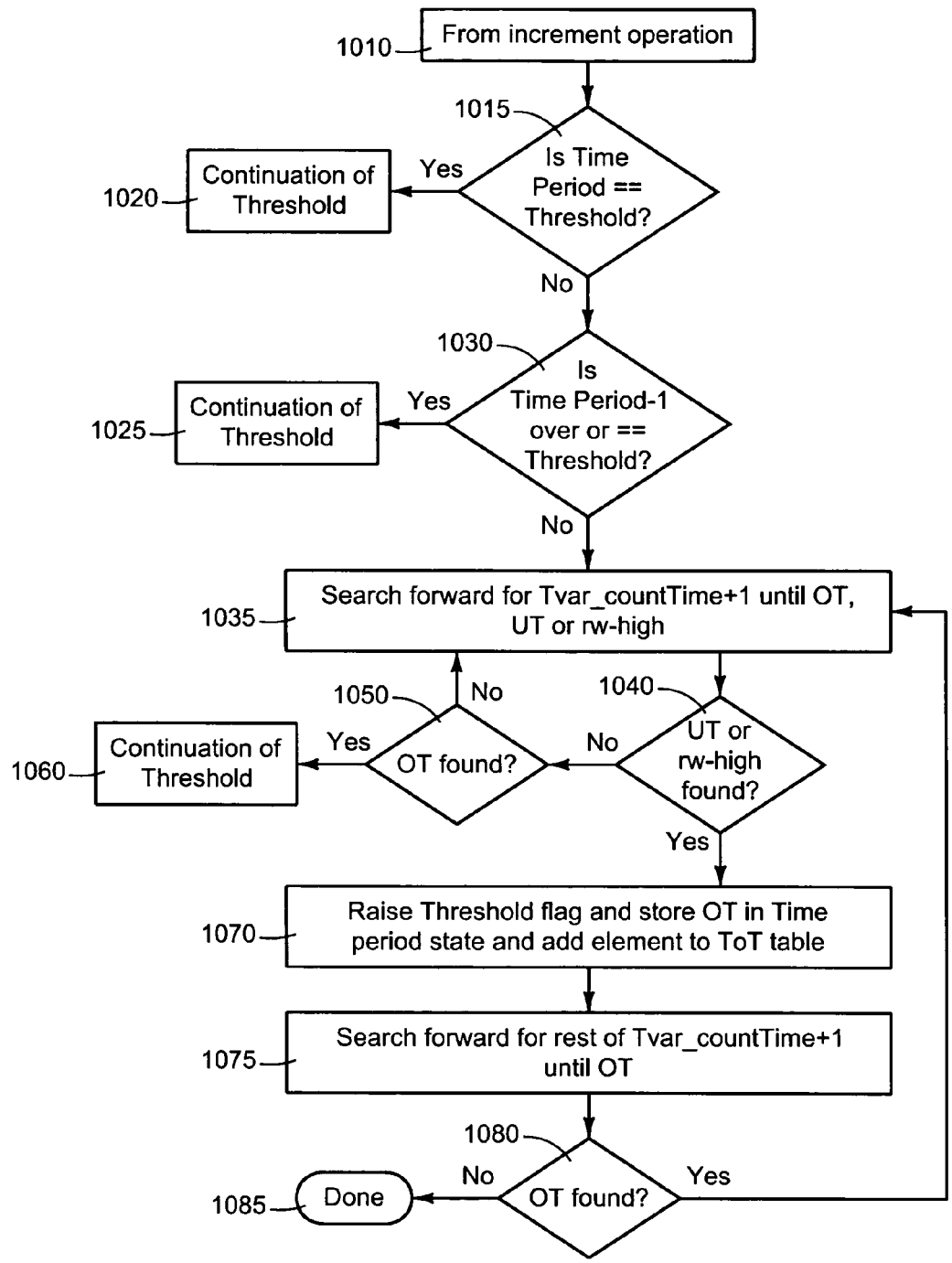
FIG. 10 shows a flowchart of a threshold sub-routine finding an over threshold breach.

FIG. 10 shows a flowchart of a threshold sub-routine finding an over threshold breach. From an increment operation 1010, the threshold tracking system will determine if a time period 102 is equal to the threshold value. If the time period 102 is equal to the threshold value, then the threshold tracking system will continue using the threshold value. If the time period is not equal to the threshold value, then the threshold tracking system will proceed to the time period minus one block 1030. If the time period 102, minus one, is greater than or equal to the threshold, then the threshold tracking system will continue using the threshold value. If the time period, minus one, is not greater than or equal to the threshold value, then the threshold tracking system will proceed to the search forward block 1035.

If the threshold tracking system is able to find either the under threshold or high response window, then the threshold tracking system will proceed to the raise threshold flag block 1070. The threshold tracking system will raise the threshold flag and store the over threshold in a time period state, and add an element to the time over threshold table. The threshold tracking system will then search forward for the rest of the Tvar_countTime+1 until finding the over threshold. If the over threshold is not found, then the sub-routine is finished. If the over threshold is found, then the threshold tracking system will return to the search forward block 1035.

If, from the search forward block 1035, the threshold tracking system is able to find either the under threshold or high response window, then the threshold tracking system will search for the over threshold. If the threshold tracking system is not able to find the over threshold, then the threshold tracking system will return to the search forward block 1035. If the threshold tracking system is able to find the over threshold, then the threshold tracking system will continue using the threshold.

Figure 11:
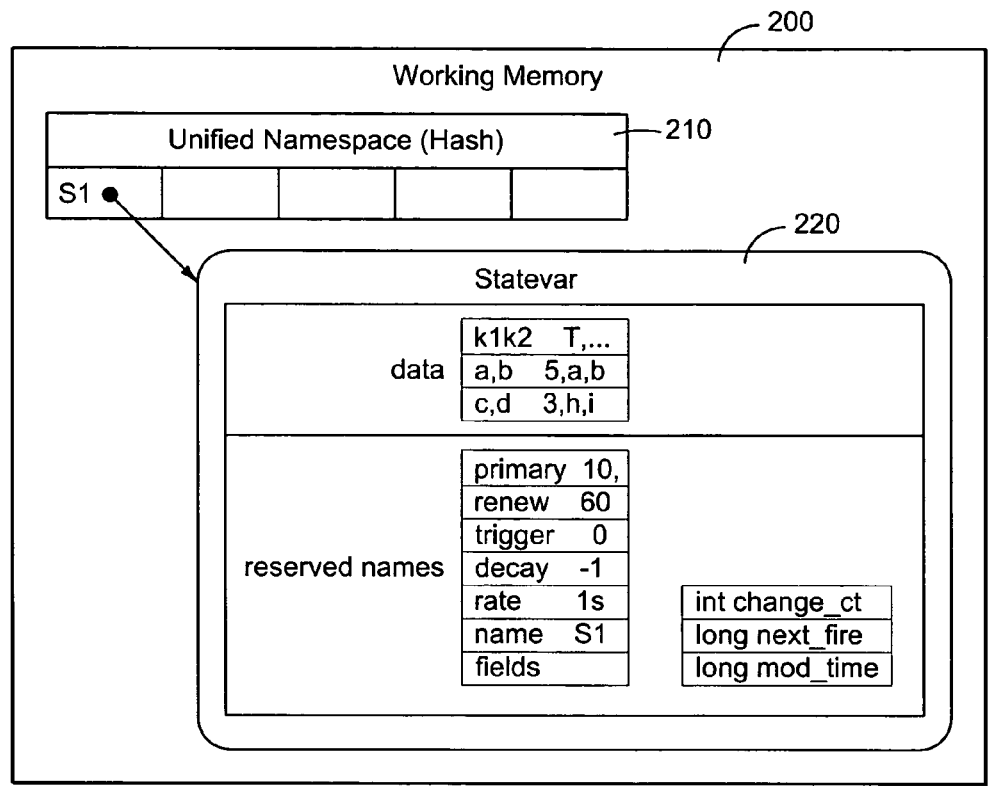
FIG. 11 shows a diagram of working memory.
Figure 12:
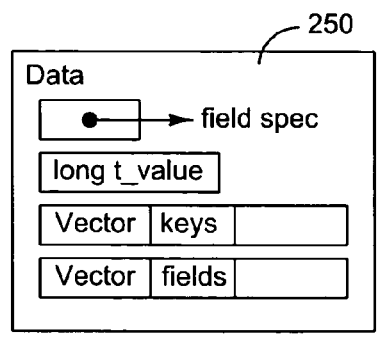
FIG. 12 shows a diagram of data stored in the working memory.

As shown in FIG. 11, a unified namespace 210 may be stored in the working memory 200. The unified namespace 210 may include data elements such as a properties hash, modification time, next fire time, and optional change count. The properties hash may comprise a String variable. The properties hash may comprise a name, a decay value, a rate value, a trigger value, a renew value, a primary value, and fields. The name may store an exact name, which is the same object as its key in the namespace 210. The decay rate may be a value periodically applied to change T values. The rate value may determine the rate at which the decay value is applied. The trigger value may be a value for T determining the time at which the statevar 220 is triggered. The renew value may be a value to which the data element's T value is set after the statevar 220 triggers a tuple. The primary value may indicate a solve value when an element is a single statevar 220. When the element is a list, a remainder of the items in the list may be data items formed by a unified key "key1, key2", which may be similar to the fields.

The fields may comprise a specification for how data are queried and extracted, such as in the format "key1, key2::T, field1, field2, field3". Keys may be concatenated together (separated by a comma), and the combined value of the keys may be used for hashing; the commas prevent false matching among empty fields and fields containing commas. The targets for data specifications may be held in special container classes. These special container classes may comprise a reference to their specification (which may be null since the container class may be the specification), a vector of key names, a vector of field names, and a long t_value, or "time value," which may be zero for the fields specification.

The statevars 220, which may comprise data and reserved names, may notify the scheduler 260 of data changes and changes to the values of the decay value, rate value, and trigger value. A mod_time may be used to keep track of the last time that all T-values were recalculated. A next_fire may be recalculated at each modification; the next_fire value may be given to the scheduler 260 at the next update time. A change_ct may track changes to variables and short-circuit re-querying of data.

The scheduler 260 of the working memory 200, shown in FIG. 13, may update statevar 220 values. The scheduler 260 may maintain a stack 290 of working memory 200 entries which is notified when a statevar 220 is modified or inserted into the working memory 200. The scheduler 260 may by implemented by the java.util.Timer. An update thread 270 of the scheduler 260 may track changes to the statevars 220. In tracking these changes, the update thread 270 may notify a waiting object whenever a change is made, ensuring that recently applied updates are not skipped. When the update thread 270 has waited long enough to require a change, the update thread 270 may call a function in a statevar 220 that recalculates the appropriate target. Statevars 220 that expire may be removed, and statevars 220 with renew values may be reset.

Although this invention has been described in terms of certain preferred embodiments, other embodiments that are apparent to those of ordinary skill in the art, including embodiments that do not provide all of the features and advantages set forth herein, are also within the scope of this invention. Accordingly, the scope of the present invention is defined only by reference to the appended claims and equivalents thereof.

We claim:

1. A system for enabling users to arrange input data according to a set time of input creation comprising:
   a means for storing input data wherein said input data represents computer network events,
   a working memory comprising a statevar and a scheduler comprising an update thread and a stack;
   wherein the statevar is configured to notify the scheduler of input data changes;
   wherein the statevar comprises at least one element of a hash table of the working memory;
   wherein the scheduler is configured to modify at least one value of the statevar;
   wherein the scheduler is configured to notify the stack of changes in the statevar; and
   wherein the update thread tracks changes to the statevar.

2. The system of claim 1 wherein the working memory further comprises a set of threshold variables, wherein each threshold variable comprises:
   a timeline comprising time periods, the time periods comprising at least one current time period, at least one future time period, at least one past time period, and a history time period,
   wherein the time periods each comprise a plurality of time frames.

3. The system of claim 2 wherein the threshold variables are configured to trigger tuples in an over threshold breach scenario, the over threshold breach scenario occurring when a number of input values received by the threshold variable per time period becomes equal to a set threshold value.

4. The system of claim 2 wherein the threshold variables are configured to trigger tuples in a time over threshold scenario, the time over threshold scenario occurring when a number of input values received by the threshold variable per time period becomes equal to or greater than a set threshold value for a set amount of time.

5. The system of claim 2 wherein:
   the system is configured to identify the threshold variables by a named location in the working memory; and the system is configured to increment the threshold variables.

6. The system of claim 5 wherein the system indexes the threshold variables by an alert type.

7. The system of claim 5 wherein the system indexes the threshold variables by a tuple type.

8. The system of claim 2 wherein:
   the threshold variables are configured to maintain data and the data's type associated with an event; and the threshold variables are configured to maintain a time slice in which the data was received.

9. The system of claim 1 wherein the system is configured to identify the statevar by a named location in working memory.

10. The system of claim 1 wherein the system is configured to change the value of the statevar by a terminal node from a match network.

11. The system of claim 1 wherein statevar is hashed by zero or more data constraints in a merged-key configuration.

12. The system of claim 1 wherein:
    the statevar is configured to create a tuple;
    the tuple comprises accumulated data; and
    the system comprises a match network that processes the accumulated data.

13. A process for allocating inputs within a timeline comprising:
    receiving an input within a response window wherein said input represents a computer network event;
    in response to receiving the input within the response window, updating a timeline and calculating a time period to increment;
    determining whether a distinct field occurs;
    in response to the distinct field not occurring, incrementing a period count;
    after incrementing the period count, determining whether the process has reached an end of the period count;
    after reaching the end of the period count, entering a threshold sub-routine.

14. The process of claim 13, wherein the threshold sub-routine comprises:
    comparing an under threshold to the response window;
    in response to the under threshold being greater than the response window, determining whether the under threshold is less than a time over threshold;
    in response to the under threshold not being less than the time over threshold, determining whether the under threshold has become greater than a threshold variable count;
    in response to the under threshold being greater than the threshold variable count, finding a next under threshold and determining whether the threshold sub-routine passed an over threshold;
    in response to the threshold sub-routine having passed an over threshold, creating a bridge with another threshold and dropping the time over threshold.

15. The process of claim 13, wherein the threshold subroutine comprises:
- determining whether a time period is equal to a threshold value;
- in response to the time period not being equal to the threshold value, determining whether the time period, minus one, is equal to or greater than the threshold value;
- in response to the time period, minus one, not being equal to or greater than the threshold value, searching for either an under threshold or high response window;
- in response to finding either the under threshold or high response window, raising a threshold flag, storing an over threshold in a time period state, adding an element to a time over threshold table, and searching for the over threshold;
- in response to finding the over threshold, searching for either an under threshold or high response window.

\* \* \* \* \*